United States Patent
Richards

(10) Patent No.: US 11,910,746 B2
(45) Date of Patent: Feb. 27, 2024

(54) APPARATUS FOR CONTROLLING DISCHARGE FROM A MOWER

(71) Applicant: Jeremiah J. Richards, Topeka, KS (US)

(72) Inventor: Jeremiah J. Richards, Topeka, KS (US)

(*) Notice: Subject to any disclaimer, the term of this patent is extended or adjusted under 35 U.S.C. 154(b) by 522 days.

(21) Appl. No.: 17/301,230

(22) Filed: Mar. 30, 2021

(65) Prior Publication Data
US 2021/0315156 A1 Oct. 14, 2021

Related U.S. Application Data

(60) Provisional application No. 63/007,032, filed on Apr. 8, 2020.

(51) Int. Cl.
| | |
|---|---|
| *A01D 34/71* | (2006.01) |
| *A01D 34/64* | (2006.01) |
| *A01D 34/81* | (2006.01) |
| *H01F 7/16* | (2006.01) |
| *H01H 23/12* | (2006.01) |

(Continued)

(52) U.S. Cl.
CPC ............ *A01D 34/71* (2013.01); *A01D 34/64* (2013.01); *A01D 34/81* (2013.01); *A01D 34/824* (2013.01); *H01F 7/16* (2013.01); *H01H 23/12* (2013.01); *A01D 2101/00* (2013.01)

(58) Field of Classification Search
CPC ........ A01D 34/71; A01D 34/64; A01D 34/81; A01D 34/824; A01D 34/2101; A01D 34/00; A01D 34/66; H01F 7/16; H01F 7/0252; H01H 23/12
See application file for complete search history.

(56) References Cited

U.S. PATENT DOCUMENTS

| | | | | |
|---|---|---|---|---|
| 4,008,559 | A * | 2/1977 | Lessig, III | A01D 34/71 56/320.2 |
| 5,442,902 | A * | 8/1995 | Mosley | A01D 42/005 D15/17 |

(Continued)

OTHER PUBLICATIONS

Power Chute Design, "Power Chute Design," Web page <https://powerchutedesign.com>, retrieved on Mar. 28, 2021.

(Continued)

*Primary Examiner* — Arpad Fabian-Kovacs
(74) *Attorney, Agent, or Firm* — LAW OFFICES OF MICHAEL L. WISE, LLC

(57) ABSTRACT

Assemblies allowing a repositionable discharge deflector to be added to a mower with a discharge chute are described. These assemblies include a base, a swing bracket, a discharge deflector, a motor, and a switch. The base is attached to the mower, and the motor is attached to the base and includes a rotating output shaft. The swing bracket is rotationally attached to the base and is rotationally coupled to the rotating output shaft of the motor. The discharge deflector is attached to the swing bracket and positionable via rotation of the rotating output shaft so as to at least partially block the discharge chute of the mower. The switch is in electrical communication with the motor and is able to cause the motor to rotate the rotating output shaft. The assemblies allow a user to modify the trajectory of mown material discharged from the discharge chute of the mower with a push of the switch.

20 Claims, 8 Drawing Sheets

(51) Int. Cl.
*A01D 34/82* (2006.01)
*A01D 101/00* (2006.01)

(56) References Cited

U.S. PATENT DOCUMENTS

| | | | | |
|---|---|---|---|---|
| 6,874,309 | B1* | 4/2005 | Bellis, Jr. | A01D 42/005 |
| | | | | 56/320.2 |
| 7,337,602 | B1* | 3/2008 | Butler | A01D 34/005 |
| | | | | 56/320.2 |
| 7,448,195 | B2 | 11/2008 | Kohler | |
| 7,594,379 | B2 | 9/2009 | Nicholson et al. | |
| 7,624,562 | B2* | 12/2009 | Kallevig | A01D 34/71 |
| | | | | 56/320.2 |
| 7,650,739 | B2* | 1/2010 | Butler | A01D 34/005 |
| | | | | 56/320.2 |
| 7,775,027 | B2* | 8/2010 | Wang | A01D 34/71 |
| | | | | 56/320.2 |
| 7,814,739 | B2* | 10/2010 | Uemura | A01D 42/005 |
| | | | | 56/320.2 |
| D700,630 | S* | 3/2014 | Davis | D15/17 |
| 10,791,672 | B2 | 10/2020 | Berglund et al. | |
| 11,516,965 | B2* | 12/2022 | Strasser | A01D 34/008 |
| 11,627,699 | B2* | 4/2023 | Foster | A01D 34/006 |
| | | | | 56/320.2 |
| 2004/0083702 | A1* | 5/2004 | Strange | A01D 43/0635 |
| | | | | 56/320.2 |
| 2008/0092509 | A1* | 4/2008 | Imanishi | A01D 42/005 |
| | | | | 56/320.2 |
| 2009/0031690 | A1 | 2/2009 | Kallevig et al. | |
| 2009/0301050 | A1 | 12/2009 | Kohler | |
| 2011/0314783 | A1* | 12/2011 | Dewey | A01D 34/668 |
| | | | | 56/10.8 |
| 2019/0075723 | A1* | 3/2019 | Spitz | A01D 34/71 |
| 2019/0082592 | A1* | 3/2019 | Berglund | A01D 34/71 |
| 2019/0261563 | A1* | 8/2019 | Condon | A01D 34/006 |

OTHER PUBLICATIONS

Grassflap, LLC, "Grass Flap," Web page <https://grassflap.myshopify.com>, retrieved on Mar. 28, 2021.
Bad Boy Mowers, Inc., "Advanced Chute System," Web page <https://www.advancedchutesystem.com/advanced-chute-system>, retrieved on Mar. 28, 2021.
GTM Manufacturing, Inc., "Qwikchute," Web page <www.quikchute.com>, retrieved on Mar. 28, 2021.
ezchute.com, "EZchute," Web page <http://www.ezchute.com>, retrieved on Mar. 28, 2021.
Ballard, Inc., "Advanced Chute Cover," Web page <https://www.ballard-inc.com/product/advanced-chute-cover/>, retrieved on Mar. 28, 2021.

* cited by examiner

Fig. 5
Fig. 6
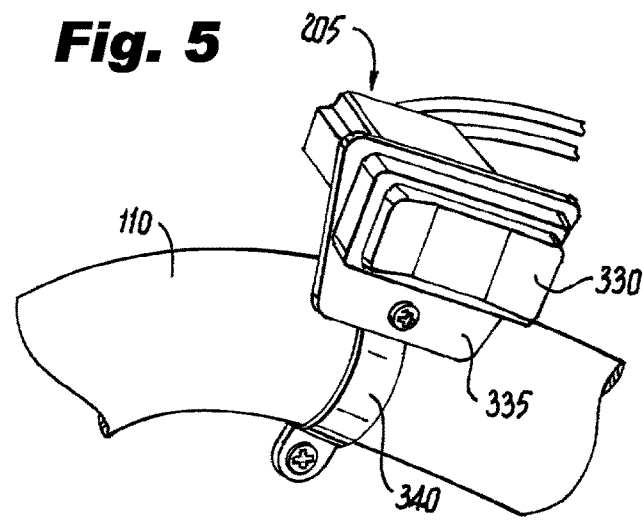
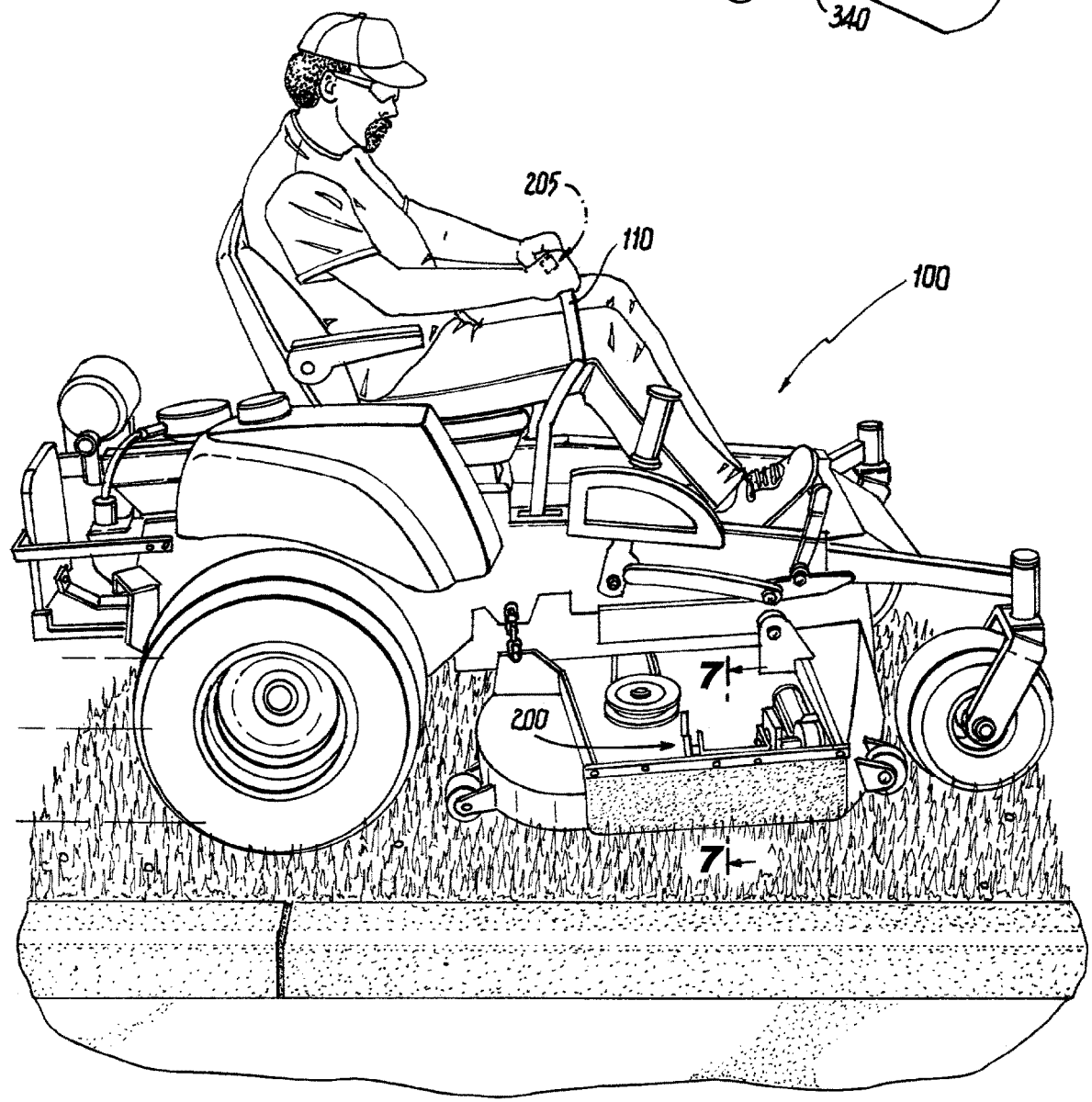

APPARATUS FOR CONTROLLING DISCHARGE FROM A MOWER

FIELD OF THE INVENTION

The present invention relates generally to mowers, and, more particularly, to apparatus for controlling the discharge of mown materials from mowers.

BACKGROUND OF THE INVENTION

Most larger mowers come with a discharge deflector that fits over the mower's discharge chute. FIG. 1, for example, shows a perspective view of a "zero-turn" riding mower 1000 fitted with a fixed discharge deflector 1005. The fixed discharge deflector 1005 is designed to stop mown objects ejected by the mower 1000 from becoming dangerous projectiles. The orientation of the fixed discharge deflector 1005 relative to the mower 1000 is fixed with the top of the discharge deflector slightly angled towards the ground.

Nevertheless, it is frequently desirable to change the orientation of a discharge deflector to change the trajectory of discharged materials. In some cases, for example, it may be desirable to mulch the mown material, that is, to trap the mown material under the mower so that it is cut several times and then deposited immediately underneath the mower rather than to the side. Other times, it may be desirable to restrict the trajectory of mown materials downward while passing by a person or an object that could be injured or damaged by thrown debris, or while passing by an area where one does not want to deposit the mown material such as on a sidewalk or street.

Attempts have been made to address the above-described deficiencies of conventional fixed discharge deflectors. Several solutions, for example, utilize a discharge deflector whose orientation can be adjusted by a lever. Nevertheless, despite being an improvement over fixed discharge deflectors, these solutions still suffer from several disadvantages. Changing the discharge deflector's orientation is relatively slow using a lever. At the same time, the user needs to let go of one or more of the mower's controls to operate the lever. Finally, this solution may not be easily retrofittable to existing mowers.

For the foregoing reasons, there is a need for new solutions that provide an adjustable discharge deflector for mowers. Ideally, the solution will be fast to change orientation, easy and safe to operate, robust, and easily retrofittable to existing mower designs.

SUMMARY OF THE INVENTION

Embodiments of the present invention address the above-identified needs by providing adjustable discharge deflectors for mowers that are actuated by motors and controlled by user-operated switches.

Aspects of the invention are directed to an apparatus comprising a mower, a base, a swing bracket, a discharge deflector, and a switch. The mower comprises a discharge chute for discharging mown material. The base is attached to the mower. The motor is attached to the base and comprises a rotating output shaft. The swing bracket is rotationally attached to the base and is rotationally coupled to the rotating output shaft. The discharge deflector is attached to the swing bracket and positionable via rotation of the rotating output shaft so as to at least partially block the discharge chute. Finally, the switch is in electrical communication with the motor and is operative to cause the motor to rotate the rotating output shaft.

Advantageously, embodiments in accordance with aspects of the invention provide solutions that are faster, safer, and more robust than many prior art solutions. These embodiments may, moreover, be retrofitted to many existing mowers.

BRIEF DESCRIPTION OF THE DRAWINGS

These and other features, aspects, and advantages of the present invention will become better understood with regard to the following description, appended claims, and accompanying drawings where:

FIG. 5 shows a perspective view of the FIG. 2 control switch assembly;

FIG. 6 shows a perspective view of the FIG. 2 mower, motorized discharge deflector assembly, and control switch assembly while actively mowing grass;

DETAILED DESCRIPTION OF THE INVENTION

The present invention will be described with reference to illustrative embodiments. For this reason, numerous modifications can be made to these embodiments and the results will still come within the scope of the invention. No limitations with respect to the specific embodiments described herein are intended or should be inferred.

As used herein, the term "mower" encompasses any type of machine used to cut grass or other vegetation that grows on the ground. The term "substantially normal" means normal within plus or minus ten degrees.

Figure 2:
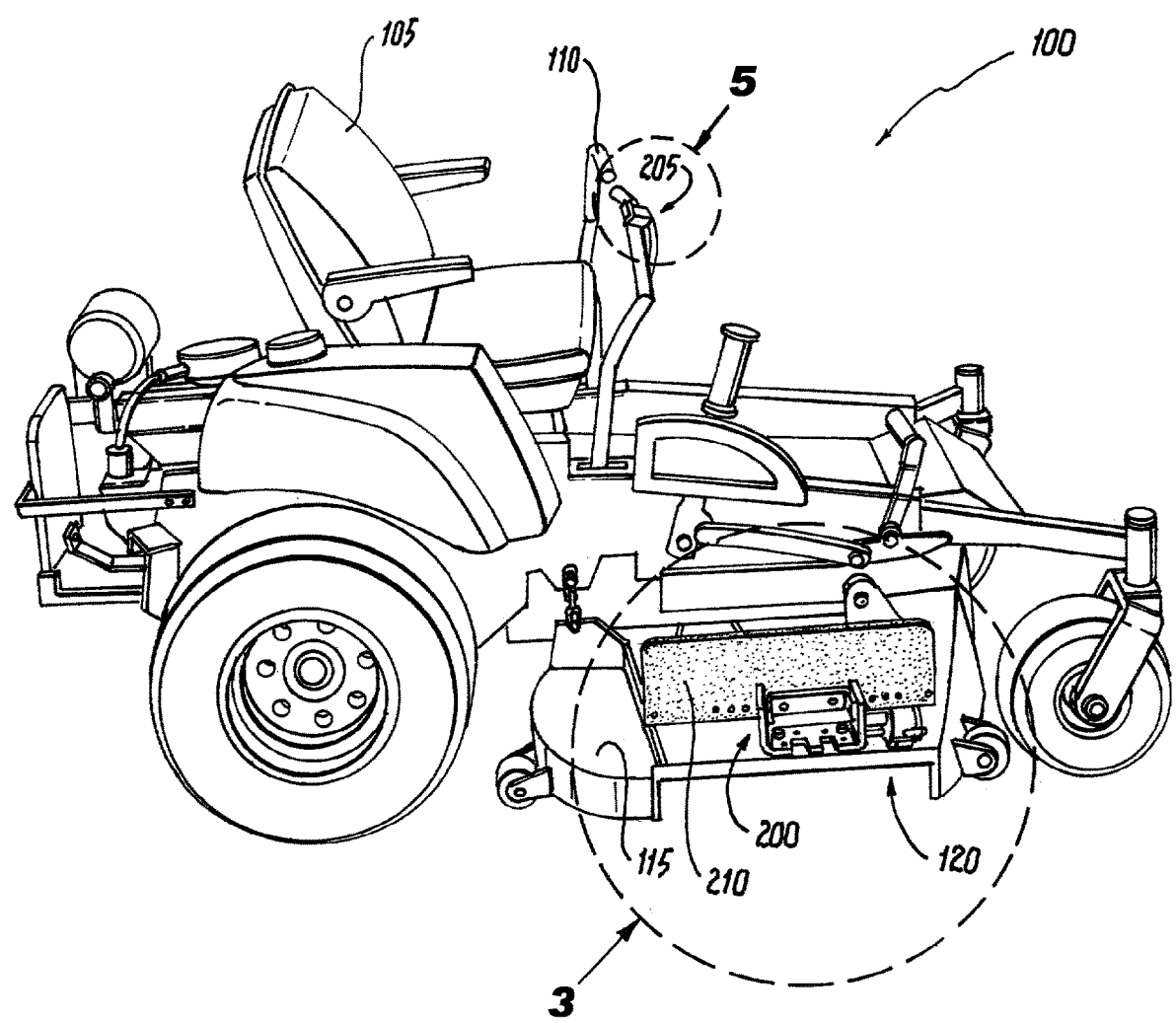
FIG. 2 shows a perspective view of a mower with a motorized discharge deflector assembly and a control switch assembly, in accordance with an illustrative embodiment of the invention.

FIG. 2 shows a perspective view of a mower 100 in accordance with an illustrative embodiment of the invention. In this particular illustrative embodiment, the mower is of the "zero-turn" variety, where the user sits in a seat 105 upon the mower and steers the mower 100 via a set of steering levers 110. One or more cutting blades under a deck 115 of the mower 100 cut the material being mown and cause it to be discharged out of a discharge chute 120.

In accordance with aspects of the invention, the mower 100 includes a motorized discharge deflector assembly 200 and a control switch assembly 205. The motorized discharge deflector assembly 200 is fixated to the top of the deck 115 of the mower 100, while the control switch assembly 205 is fixated to one of the steering levers 110 of the mower 100. The control switch assembly 205 allows a user to control the position of a discharge deflector 210 through a continuous range of positions in relation to the discharge chute 120. In FIG. 2, for example, the discharge deflector 210 is in its most upright position and not acting to affect the trajectory of mown materials expelled from the discharge chute 120. Other positions for the discharge deflector 210 are described below.

Figure 3:
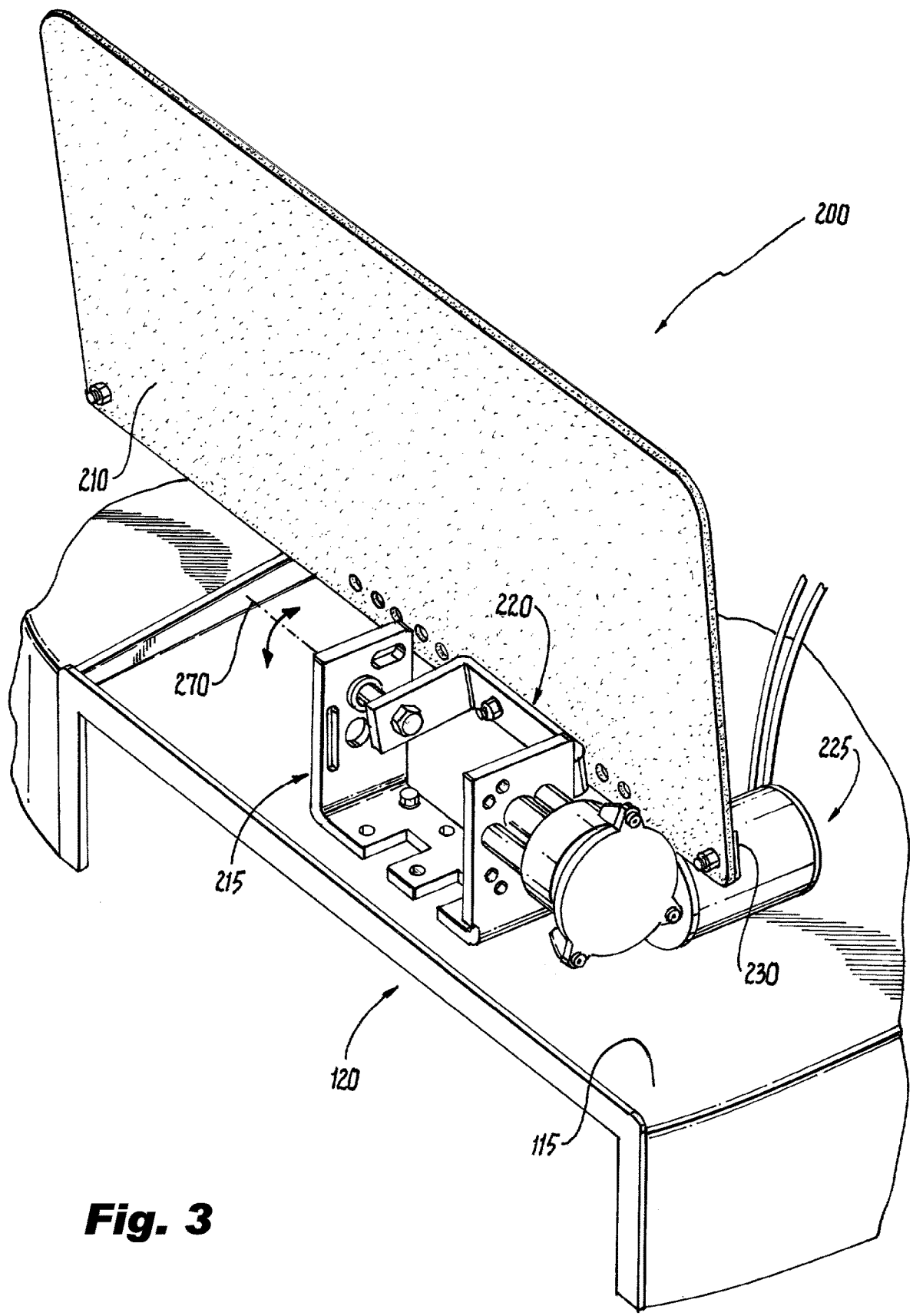
FIG. 3 shows a perspective view of the FIG. 2 motorized discharge deflector assembly.
Figure 4:
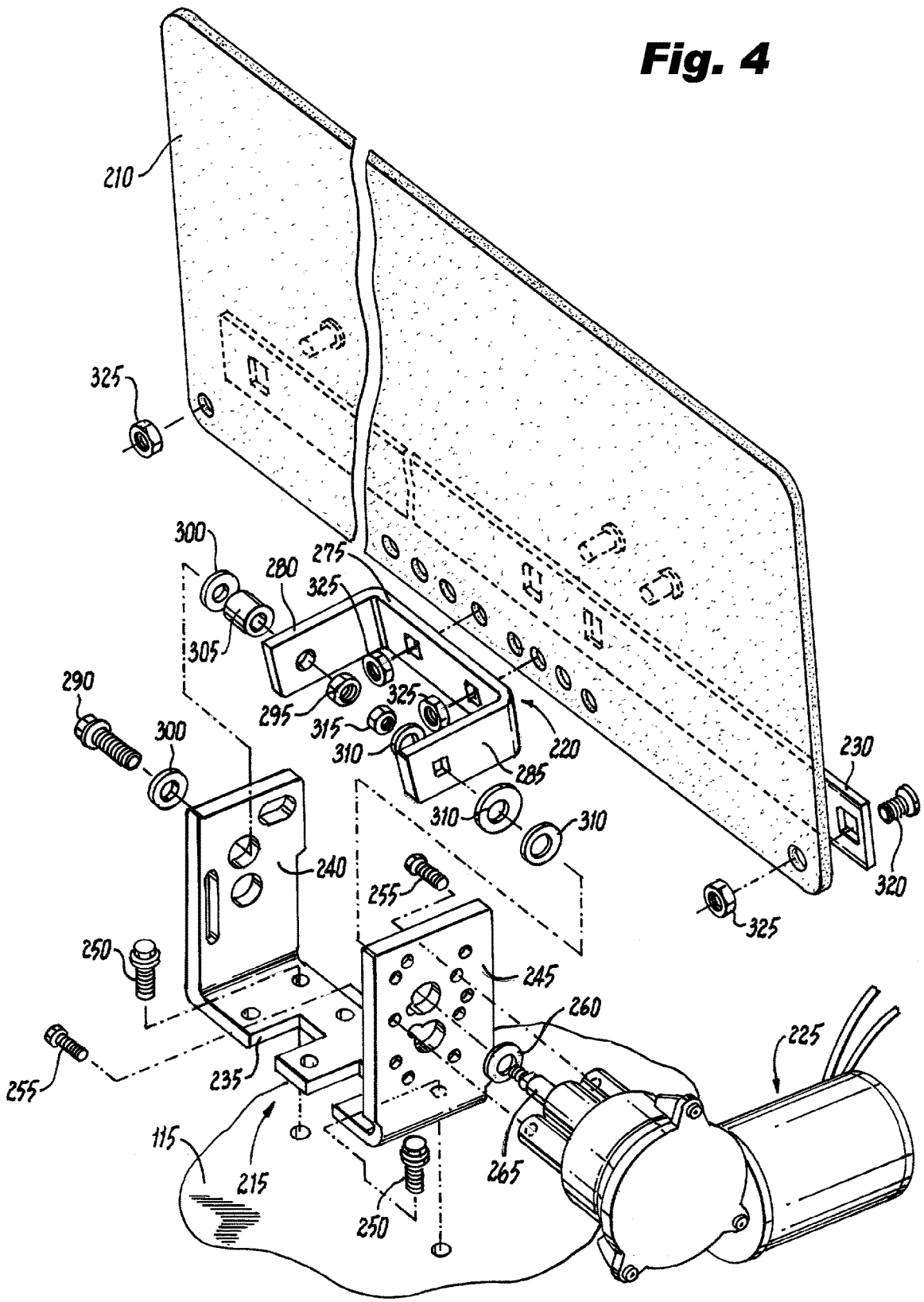
FIG. 4 shows an exploded perspective view of the FIG. 2 motorized discharge deflector assembly.

FIG. 3 shows a perspective view of the motorized discharge deflector assembly 200, while FIG. 4 shows an exploded perspective view of the same assembly 200. The motorized discharge deflector assembly 200 comprises the following main elements: a base 215, a swing bracket 220, a motor 225, the discharge deflector 210, and a deflector strap 230.

The base 215 is a u-shaped bracket with a middle base region 235 spanning between a left base region 240 and a right base region 245 that are oriented substantially normal to the middle base region 235. A plurality of holes in these regions 235, 240, 245 allow the base 215 to be fixated to the mower 100 and also allow other elements to be attached to and pass through the base 215. First bolts 250 fixate the middle base region 235 to the deck 115. At the same time, the motor 225 is fixated to the right base region 245 via second bolts 255 and a first washer 260. With the motor 225 attached in this manner, a rotating output shaft 265 of the motor 225 passes through a hole in the right base region 245 so that a distal portion of the rotating output shaft 265 occupies the region between the left base region 240 and the right base region 245. The distal portion of the rotating output shaft 265 defines a set of flat regions, giving some of the rotating output shaft 265 a non-circular cross-section. The distal portion of the rotating output shaft 265 terminates in a short, externally threaded stud. The rotating output shaft 265 rotates about a rotational axis 270.

The swing bracket 220 is also a u-shaped bracket, comprising a middle bracket region 275 spanning between a left bracket region 280 and a right bracket region 285 that are oriented substantially normal to the middle bracket region 275. It too defines a number of holes. The swing bracket 220 is rotationally attached to the base 215 and rotatably coupled to the rotating output shaft 265 of the motor 225 so that it rotates about the same rotational axis as the rotating output shaft 265, namely, the rotational axis 270. This is accomplished by having the left bracket region 280 of the swing bracket 220 rotationally attach to the left base region 240 of the base 215 via a third bolt 290, a first nut 295, second washers 300, and a spacer 305. Simultaneously, the right bracket region is rotationally attached to the rotating output shaft 265 via third washers 310 and a second nut 315. In so doing, the distal portion of the rotating output shaft 265 with the non-circular cross-section passes through and engages a hole with a complementary cross-section in the left bracket region 280 of the swing bracket 220. The swing bracket 220 is thereby rotationally coupled to the rotating output shaft 265 of the motor 225 with the rotational axis 270 passing through the left bracket region 280 and the right bracket region 285. The swing bracket 220 is positioned between the left base region 240 and the right base region 245 of the base 215.

The deflector strap 230 is fixated externally to the discharge deflector 210 and provides a means of attaching the discharge deflector 210 to the middle bracket region 275 of the swing bracket 220. In this example, this is accomplished by fourth bolts 320 and third nuts 325.

FIG. 5 shows a perspective view of the control switch assembly 205. The control switch assembly 205 comprises a momentary rocker switch 330, a mounting plate 335, and a clamp 340. The mounting plate 335 and the clamp 340 allow the momentary rocker switch 330 to be mounted to one of the steering levers 110 of the mower 100. The momentary rocker switch 330 is in electrical communication with a power source on the mower 100, such as the mower's battery, and is in further electrical communication with the motor 225. Pressing one side of the momentary rocker switch 330 causes the rotating output shaft 265 to rotate in one direction, while pressing the other side of the momentary rocker switch 330 causes the rotating output shaft 265 to rotate in the opposite direction.

In this manner, the base 215 is attached to the mower 100, which includes the discharge chute 120. The motor 225 is attached to the base 215 and comprises the rotating output shaft 265. The swing bracket 220 is rotationally attached to the base 215 and is rotationally coupled to the rotating output shaft 265. The discharge deflector 210 is attached to the swing bracket 220 and is positionable via rotation of the rotating output shaft 265 so as to at least partially block the discharge chute 120. The momentary rocker switch 330 is in electrical communication with the motor 225 and causes the motor 225 to rotate the rotating output shaft 265.

Figure 7:
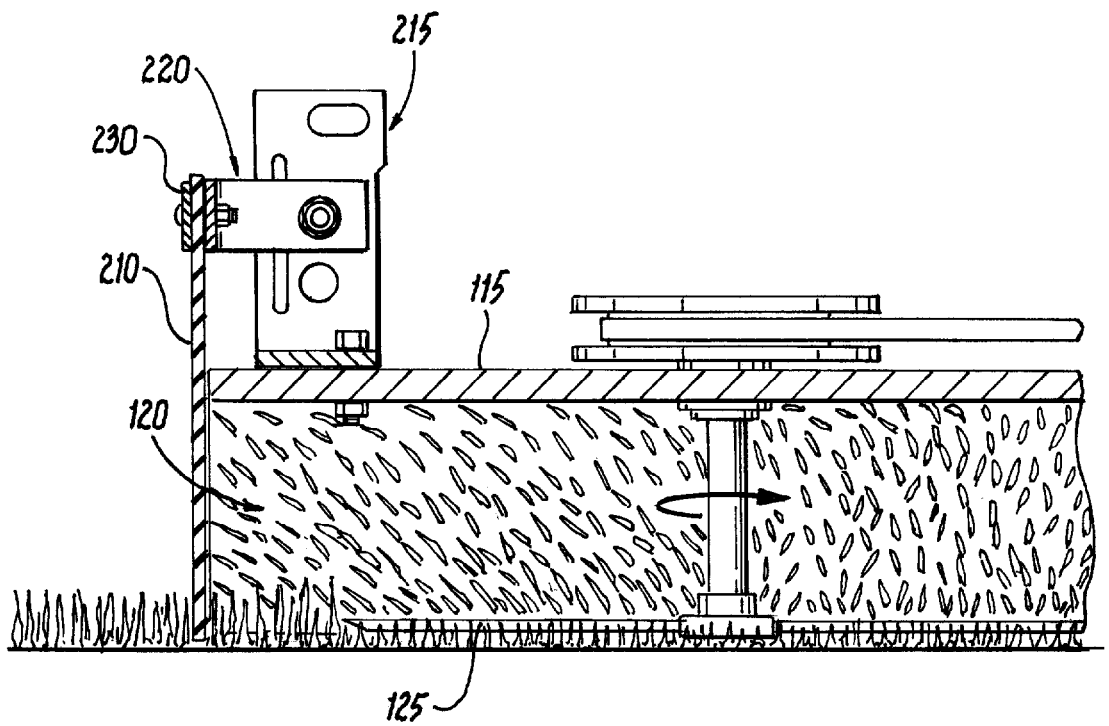
FIG. 7 shows a sectional view along the cleave plane indicated in FIG. 6.
Figure 8:
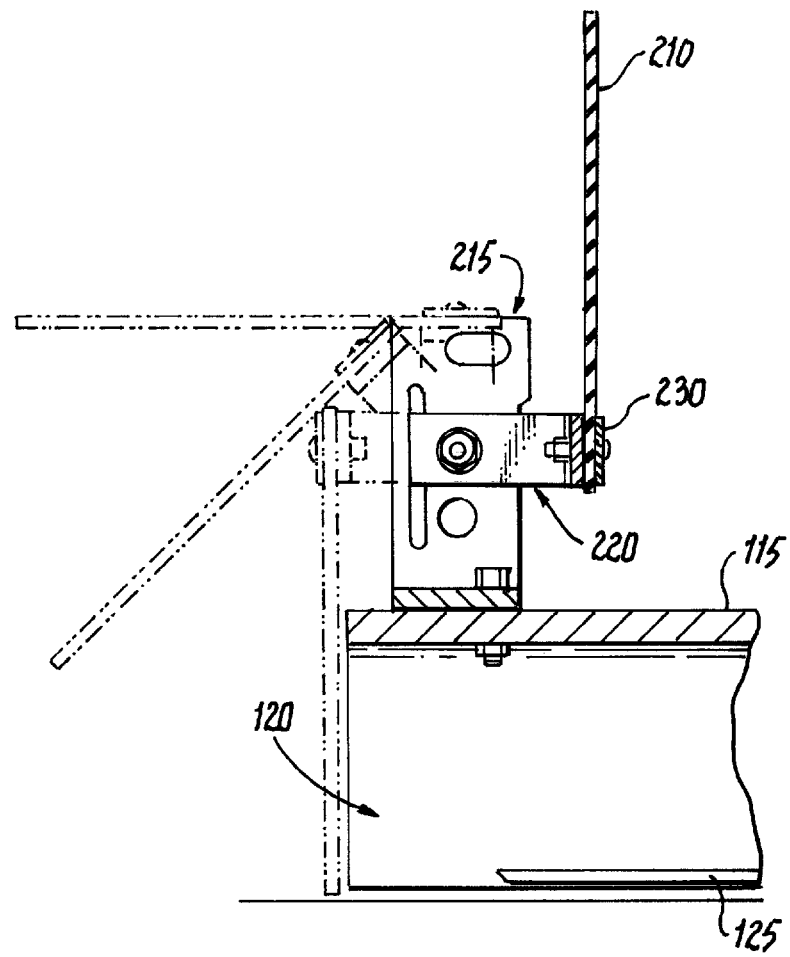
FIG. 8 shows a sectional view similar to FIG. 7 but with the discharge deflector shown in various positions.

FIGS. 6-8 show additional aspects of the motorized discharge deflector assembly 200 and the control switch assembly 205 in use on the mower 100. FIG. 6 shows a perspective view of these elements while actively mowing grass. FIG. 7 shows a sectional view along the cleave plane indicated in FIG. 6. Finally, FIG. 8 shows a sectional view similar to FIG. 7 but with the discharge deflector 210 shown in various positions relative to the discharge chute 120.

Figure 1:
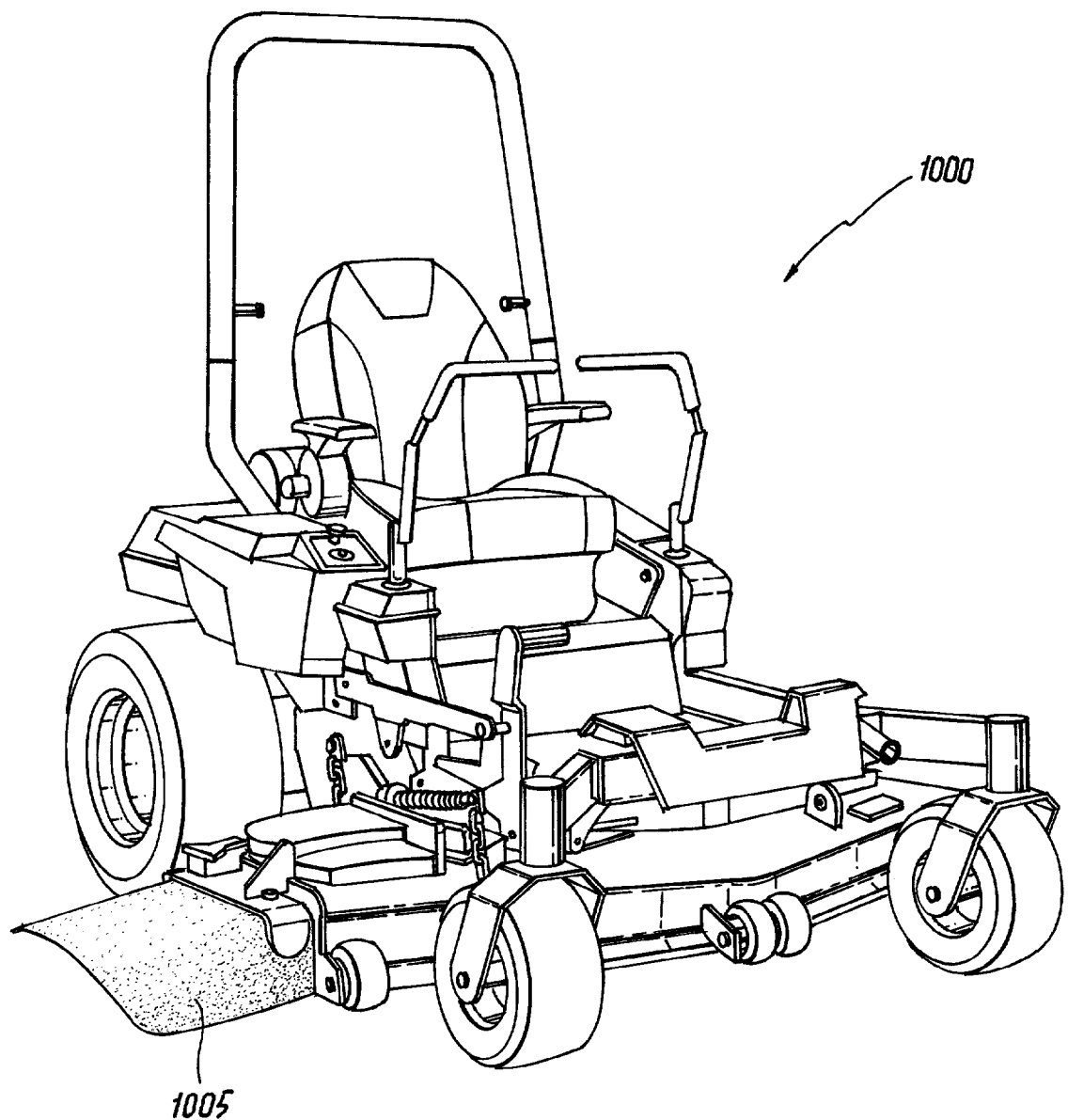
FIG. 1 shows a perspective view of a mower with a conventional discharge deflector.

As indicated earlier, the momentary rocker switch 330 allows a user to control the position of the discharge deflector 210 through a continuous range of positions in relation to the discharge chute 120. In FIG. 2, for example, the discharge deflector 210 is in its most upright position and not acting to affect the trajectory of mown materials expelled from the discharge chute 120. This most upright position may be advantageous when, for example, servicing the mower 100, passing the mower 100 through a narrow opening such as through a gate, or when loading the mower 100 on a trailer. By contrast, in FIGS. 6 and 7, the discharge deflector 210 is in its most downward position and essentially blocks any discharge from the discharge chute 120. This most downward position is useful in restricting the trajectory of mown materials downward while passing by a person or an object that could be injured or damaged by thrown debris or while passing by an area where one does not want to deposit the mown material, such as on a sidewalk or street. Moreover, with the discharge deflector 210 in its most downward position, a cutting blade 125 of the mower 100 is able to cut the grass several times and the mown material is deposited directly under the mower 100, allowing the mower to perform a mulching function. In FIG. 8, various other positions of the discharge deflector 210 are shown. With the discharge deflector 210 in an intermediate position between most upward and most downward, the discharge deflector 210 may act like the fixed deflector found on many mowers (see FIG. 1).

The motorized discharge deflector assembly 200 and the control switch assembly 205, and, more generally, apparatus in accordance with aspects of the invention, thereby provide several advantages to a user when attached to a mower. Repositioning the discharge deflector 210 relative to the discharge chute 120 can be accomplished with a push of the momentary rocker switch 330 without the user having to take his or her hands off the controls of the mower, unlike mechanisms that utilize levers for the positioning. The motor 225 almost instantly moves the discharge deflector 210 and the direct connection between the rotating output shaft 265 of the motor 225 and the swing bracket 220 lends the mechanism strength and robustness. Lastly, apparatus in accordance with aspects of the invention can be readily retrofitted to large numbers of existing mowers. The base 215 and the swing bracket 220 are, for example, fitted with extra holes (visible in, for example, FIG. 4), which allow the swing bracket 220 to be lowered in the base 215 to adapt to different mower designs.

Many of the components of the motorized discharge deflector assembly 200 and the control switch assembly 205 may be sourced from commercial sources. The motor 225 may, as just one example, comprise a DR25 Permanent Magnet Direct Current (PMDC) Right Angle Worm Drive Motor available from DUMORE® CORP. (Mauston, WI, USA). Motors with worm drive gears, particularly those formed of metal, are especially well suited for the present application because of their robustness and are thereby preferred. Those with plastic gearing may not be reliable. Moreover, the momentary rocker switch 330 may comprise a Double-Pole, Double-Throw (DPDT) switch wired as a reversing switch for the motor 225 so as to reverse the polarity of the voltage to the motor 225 when each of the two sub-switches is actuated. One of the two sub-switches thereby drives the motor 225 in one direction, and the other sub-switch drives the motor 225 in the opposite direction. Such switches are available commercially from, for example, MCMASTER-CARR® SUPPLY CO. (Elmhurst, IL, USA).

At the same time, manufacture of the custom components within the motorized discharge deflector assembly 200 and the control switch assembly 205 will be within those skilled in the relevant manufacturing arts once familiar with the description provided herein. The base 215 and the swing bracket 220 may be formed of, for example, metal, and the discharge deflector 210 may be formed of, for example, metal, plastic, or rubber. The metal elements may be formed by conventional metal forming techniques (e.g., cutting, bending, drilling, etc.). Plastic and rubber components may be formed by conventional plastic and rubber forming techniques (e.g., injection molding).

It should again be emphasized that the above-described embodiments of the invention are intended to be illustrative only. Other embodiments can use different types and arrangements of elements for implementing the described functionality. These numerous alternative embodiments within the scope of the appended claims will be apparent to one skilled in the art. The spirit and scope of the appended claims should not be limited solely to the description of the preferred embodiments contained herein.

While, for example, the above-described embodiments are fitted to a particular type of mower, this is merely by way of example and aspects of the invention may be applied to any number of mower designs. This versatility is, in fact, one of the advantageous features of embodiments in accordance with aspects of the invention. At the same time, while the switch in the above-described embodiment is of a particular type and is mounted to a mower's steering lever, alternative embodiments may use any kind of equally suitable switch and/or may mount the switch elsewhere on the mower. In one or more alternative embodiments, for example, a toggle switch may be mounted to a mower's control panel or a foot-activated switch may be utilized.

Figure 9:
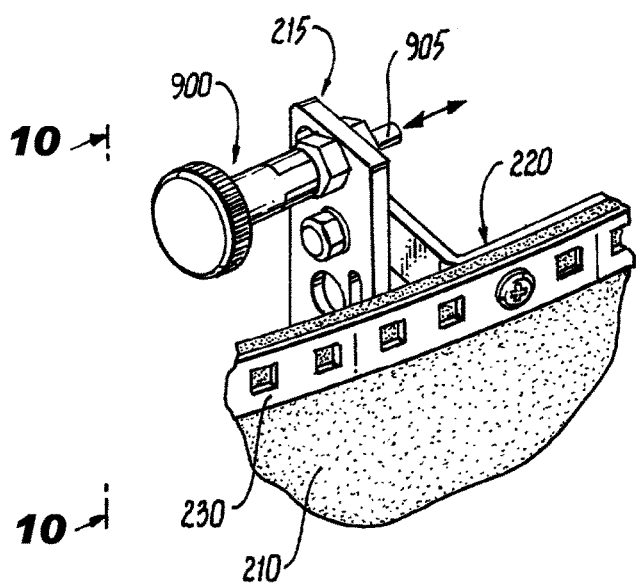
FIG. 9 shows a perspective view of a portion of the FIG. 2 motorized discharge deflector assembly with the addition of a retractable spring plunger.
Figure 10:
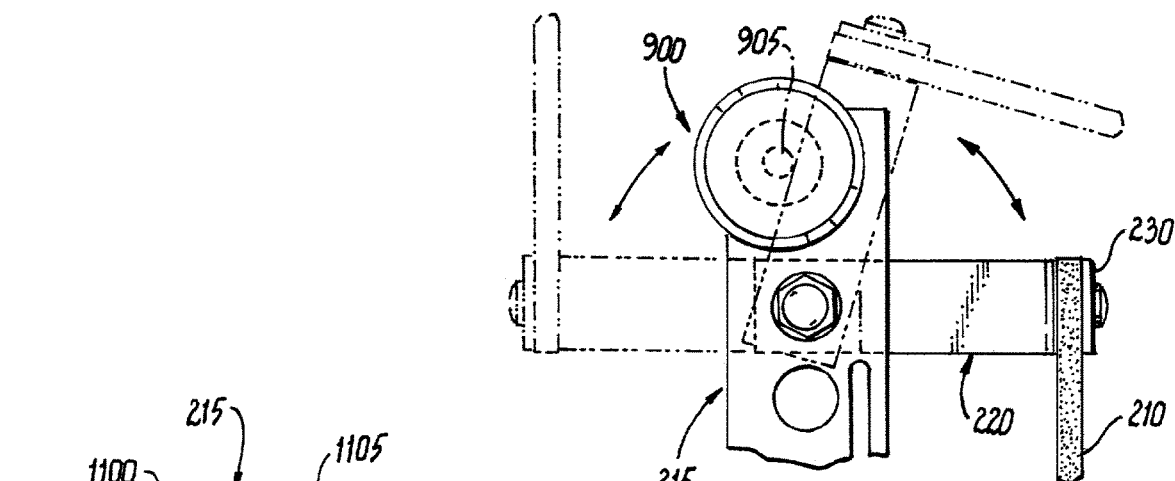
FIG. 10 shows a sectional view along the cleave plane indicated in FIG. 9.

Moreover, in some applications, a user may want to limit the upward travel of the discharge deflector 210 in the upward direction so as to not allow discharge from the discharge chute 120 to go unchecked. FIGS. 9 and 10 show aspects of an optional limiting device that may be used for this purpose. More particularly, FIG. 9 shows a perspective view of a portion of the motorized discharge deflector assembly 200 with the addition of a retractable spring plunger 900, while FIG. 10 shows a sectional view of these elements along the cleave plane indicated in FIG. 9. The retractable spring plunger 900 is attached to the top of the left base region 240. The retractable spring plunger 900 is able to take on two states: an extended state with a plunger 905 extended, and a retracted state with the plunger 905 retracted. In the extended state, the plunger 905 interferes with the upward motion of the swing bracket 220 and thereby limits the range of positions achievable by the discharge deflector 210, particularly in the upward direction. In the retracted state, no such interference occurs and the swing bracket 220 is allowed to move across its full range of travel.

Figure 11:
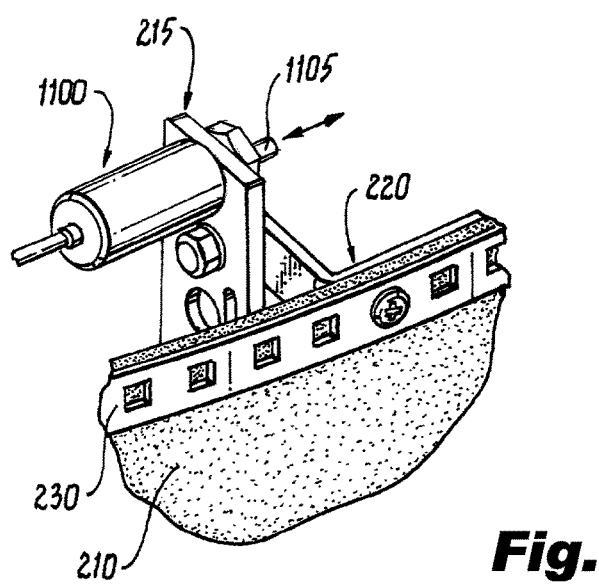
FIG. 11 shows a perspective view a portion of the FIG. 2 motorized discharge deflector assembly with the addition of a plunger solenoid.

FIG. 11 shows a perspective view of a portion of the motorized discharge deflector assembly 200 with the addition of another optional limiting device, this one a plunger solenoid 1100. Like the retractable spring plunger 900, the plunger solenoid 1100 is attached to the top of the left base region 240 of the base 215. And like the retractable spring plunger 900, the plunger solenoid 1100 is able to take on an extended state with a plunger 1105 extended so as to interfere with the upward travel of the swing bracket 220 and a retracted state where no such interference occurs. It is contemplated that the plunger solenoid 1100 may be actuated by the same circuitry on the mower 100 that actuates the power take-off (PTO) clutch for the cutting blade 125. In this manner, the plunger solenoid 1100 will take on its extended state when the cutting blade 125 is spinning and will take on its retraced state when the cutting blade 125 is still. Correspondingly, upward movement of the discharge deflector 210 will be limited when the cutting blade 125 is spinning.

Figure 12:
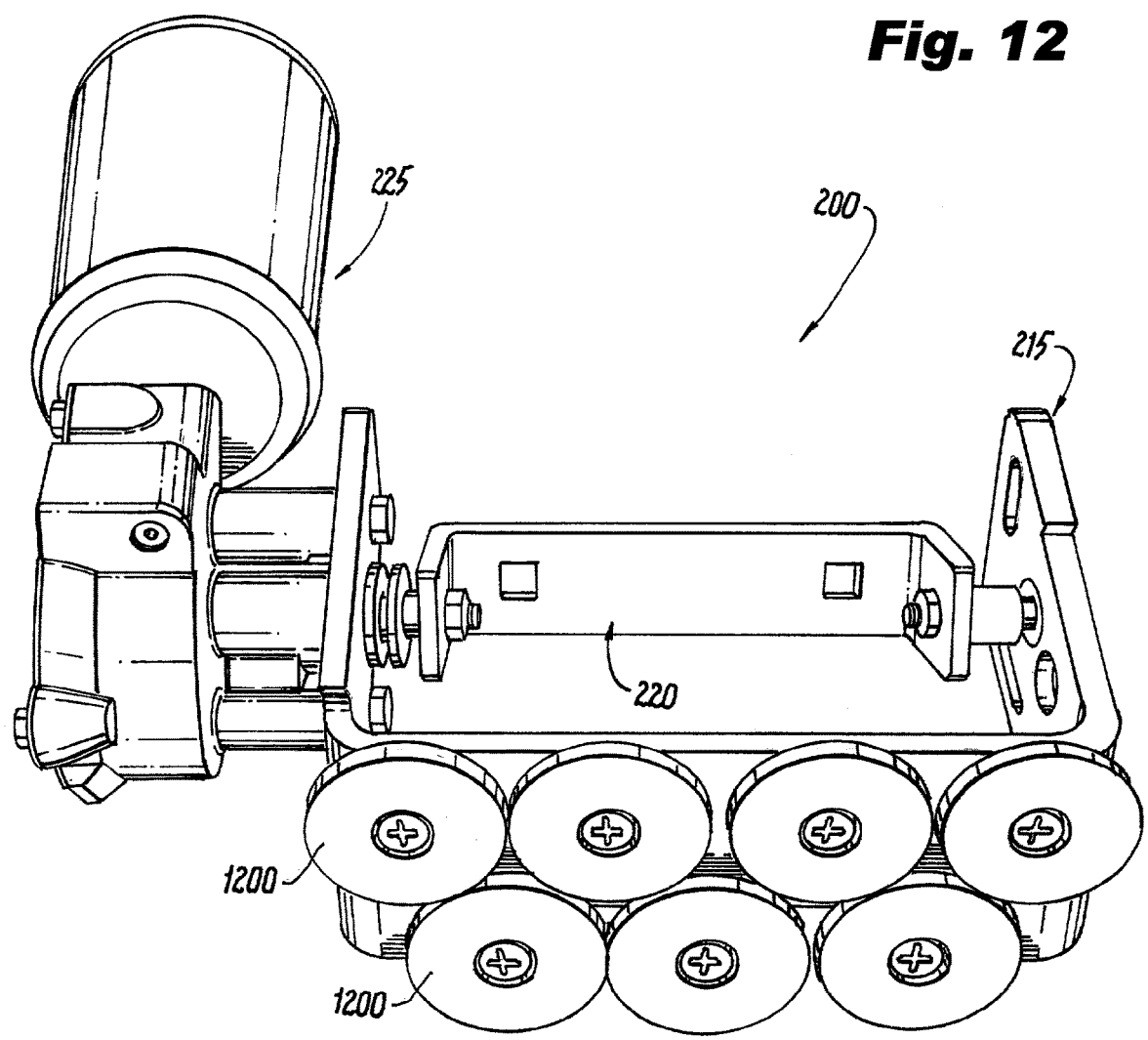
FIG. 12 shows a perspective view of the FIG. 2 motorized discharge deflector assembly with the addition of magnets.

In even another embodiment of the invention, magnets may be utilized instead of the first bolts 250 to attach the motorized discharge deflector assembly 200 to the mower 100, making the motorized discharge deflector assembly 200 easily installed and removed without the use of tools and without the need to drill holes in the mower 100. FIG. 12 shows a perspective view of such an option, with magnets 1200 attached to the middle base region 235 of the base 215.

Figure 13:
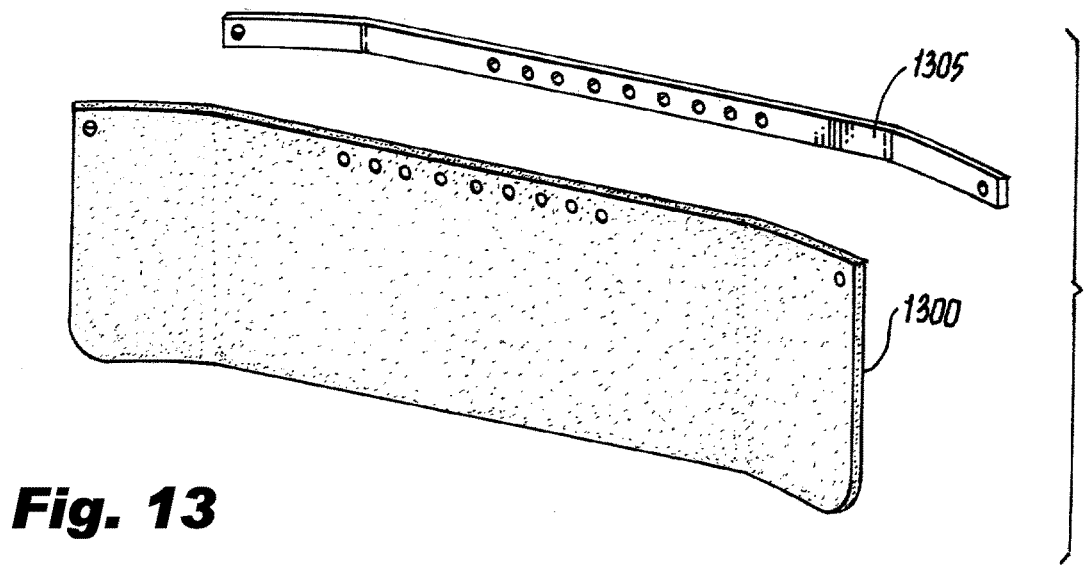
FIG. 13 shows an exploded perspective view of a modified discharge deflector and a modified deflector strap.

Lastly, while the discharge deflector 210 in the motorized discharge deflector assembly 200 is largely straight, it can be shaped to better accommodate different mower designs and to provide some protection from debris leaving the discharge chute toward the front and rear of the mower. FIG. 13 shows an exploded perspective view of a modified discharge deflector 1300 and a modified deflector strap 1305. The modified discharge deflector 1300 is turned somewhat inward at its lateral ends, resembling the shape of the fixed discharge deflector 1005 in FIG. 1.

All the features disclosed herein may be replaced by alternative features serving the same, equivalent, or similar purposes, unless expressly stated otherwise. Thus, unless expressly stated otherwise, each feature disclosed is one example only of a generic series of equivalent or similar features.

What is claimed is:

1. An apparatus comprising:
   a mower comprising a discharge chute for discharging mown material;
   a base attached to the mower;
   a motor attached to the base and comprising a rotating output shaft, which rotates about a rotational axis;
   a swing bracket rotationally attached to the base and rotationally coupled to the rotating output shaft;
   a discharge deflector attached to the swing bracket and positionable via rotation of the rotating output shaft so as to at least partially block the discharge chute; and
   a switch in electrical communication with the motor and operative to cause the motor to rotate the rotating output shaft;
   wherein the rotational axis passes through the base and the swing bracket.

2. The apparatus of claim 1, further comprising a plurality of magnets attaching the base to the mower.

3. The apparatus of claim 1, wherein the base comprises a u-shaped bracket defining a middle base region spanning between a left base region and a right base region that are oriented substantially normal to the middle base region.

4. The apparatus of claim 3, wherein at least part of the swing bracket is positioned between the left base region and the right base region.

5. The apparatus of claim 1, wherein the motor comprises a DC motor.

6. The apparatus of claim 1, wherein the motor comprises a worm drive gear.

7. The apparatus of claim 1, wherein a portion of the rotating output shaft has a non-circular cross-section.

8. The apparatus of claim 1, wherein the swing bracket comprises a u-shaped bracket defining a middle bracket region spanning between a left bracket region and a right bracket region that are oriented substantially normal to the middle bracket region.

9. The apparatus of claim 8, wherein the discharge deflector is attached to the middle bracket region.

10. The apparatus of claim 8, wherein the rotational axis passes through the left bracket region and the right bracket region.

11. The apparatus of claim 1, wherein:
    the swing bracket defines a hole; and
    the rotating output shaft passes through the hole.

12. The apparatus of claim 11, wherein the hole is non-circular.

13. The apparatus of claim 1, wherein:
    the mower comprises a battery; and
    the switch is electrically connected to the battery.

14. The apparatus of claim 1, wherein the switch comprises a double-pole, double-throw switch wired as a reversing switch for the motor.

15. The apparatus of claim 1, wherein the switch comprises a rocker switch.

16. The apparatus of claim 1, wherein:
    the mower further comprises a control; and
    the switch is attached to the control.

17. The apparatus of claim 16, further comprising a clamp attaching the switch to the control.

18. The apparatus of claim 16, wherein the control is a steering lever.

19. The apparatus of claim 1, further comprising a retractable spring plunger attached to the base and operative to take on a retracted state and an extended state, wherein:
    the retractable spring plunger interferes with movement of the swing bracket with the retractable spring plunger in its extended state; and
    the retractable spring plunger does not interfere with movement of the swing bracket with the retractable spring plunger in its retracted state.

20. The apparatus of claim 1, further comprising a plunger solenoid attached to the base and operative to take on a retracted state and an extended state, wherein:
    the plunger solenoid interferes with movement of the swing bracket with the plunger solenoid in its extended state; and
    the plunger solenoid does not interfere with movement of the swing bracket with the plunger solenoid in its retracted state.

* * * * *